April 10, 1962  J. W. CROOK ETAL  3,028,839
ANIMAL RESTRAINER AND EXPOSURE CHAMBER
Filed Oct. 14, 1960
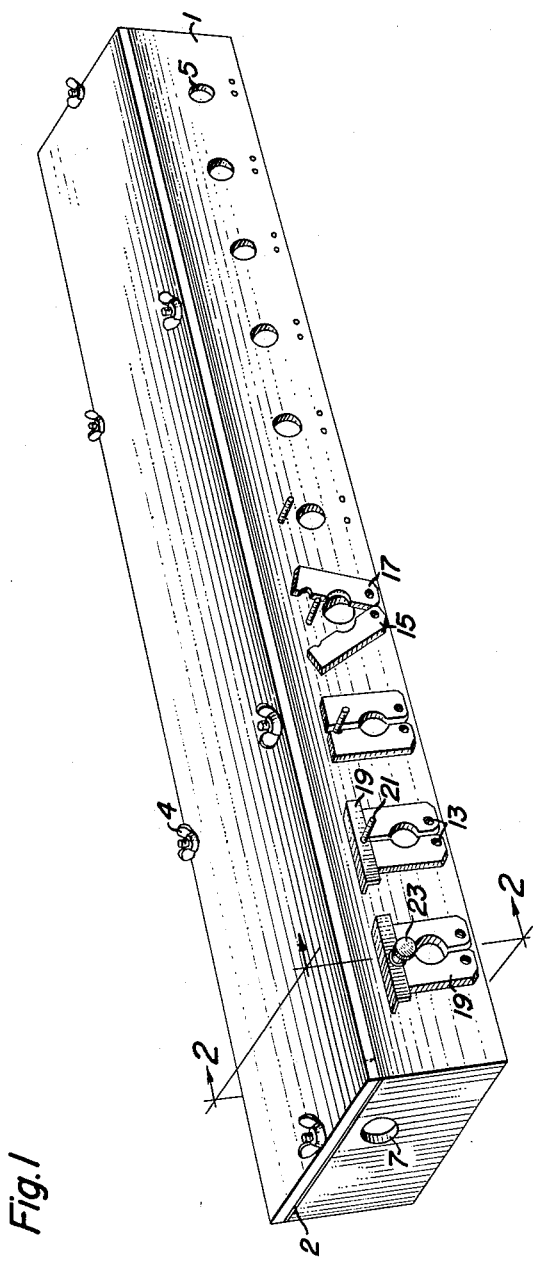
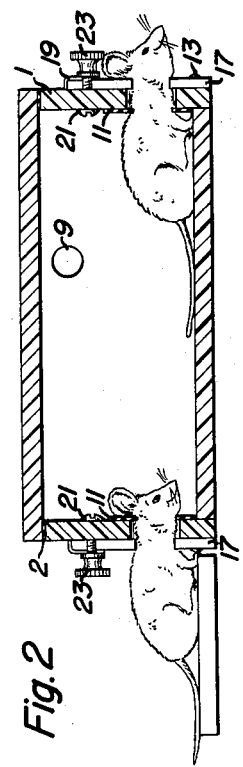
INVENTORS
James W. Crook
William S. Koon
BY George Renehan
ATTORNEY 3,028,839
ANIMAL RESTRAINER AND EXPOSURE
CHAMBER
James W. Crook, Baltimore, and William S. Koon, Edgewood, Md., assignors to the United States of America as represented by the Secretary of the Army
Filed Oct. 14, 1960, Ser. No. 62,807
3 Claims. (Cl. 119—159)
(Granted under Title 35, U.S. Code (1952), sec. 266)

This invention described herein may be manufactured and urged by or for the Government of the United States of America for governmental purposes without the payment to us of any royalty thereon.

This invention relates to an apparatus intended to be used for the purpose of restraining small animals such as rodents, especially mice (or can be enlarged to accommodate larger animal species) while they are being subjected to toxic agents, either vapor or aerosol, by either percutaneous (body only) or inhalation (head only) routes separately or simultaneously.

Our invention consists, essentially, in providing a box or case with a series of holes in the sides through which the heads of the mice or rodents are projected, arranging suitable jaws adjacent to the openings and preventing the mice or rodents from withdrawing their heads.

The invention consists also in certain details of construction and novelties of combination, all of which will be fully described hereinafter and pointed out in the claims.

In the drawing forming a part of this specification,

FIG. 1 is a perspective view of our animal restrainer and exposure chamber constructed in accordance with our invention.

FIG. 2 is an enlarged cross-sectional view taken on line 2—2 of FIG. 1 showing the animals in position.

The apparatus, which can be made of plywood or metal, but is ordinarily made of transparent plastic for ease of observation, consists of a rectangular box 1 having a rubber gasket 2 with a removable cover 3, held in place by thumb screws 4.

The side walls of the box have a plurality of holes 5, which are centrally located and evenly spaced. The ends of the box have openings 7 and 9 for the ingress and egress of toxic agents. If it is desired the openings 7 and 9 may be used for the ingress and egress of fresh air, when the box is used for exposing animals where the toxic agent is external to the box, as inside a large gassing chamber. The box, on the inside surface of the side walls has cemented onto it rubber gaskets 11. Each of the gaskets 11, has a plurality of holes, but of somewhat smaller diameter than the holes 5, and is of a width greater than the holes 5, approximately 1/64″ thick, and runs along the entire length of the side of the said box. The holes in the gasket 11 are so located that they are concentric with the holes 5. On the outside surface of the side walls of the box 1, located beneath the holes 5 are pivotally movable jaws 15 and 17 fastened by screws 13. When in a closed position the jaws, define a hole such that the animal's head cannot be withdrawn and they are held or locked in place at their upper ends by a retaining angle 19 which is penetrated by a screw 21, the latter having at the end a knurled nut 23.

In order to conduct first the percutaneous studies, the operator removes from the apparatus the thumb screw and the cover, and on the outer sides the knurled nut and the retaining angle thereby spreading apart the jaws. The operator then places the animal inside of the box or chamber protruding its head out through the smaller hole in the rubber gasket, the larger hole inside of the box, and the now open jaws. When placed in the desired position, the mouse is restrained around its neck by joining the two jaws at the top. The jaws are held together by the retaining angle which in turn is held in place by the knurled nut. After replacing the cover, toxic agents can then be introduced into the chamber through the holes located in the ends of the box. The snug fit of the thin rubber gasket around the neck of the mouse and the rubber gasket beneath the cover, serve to prevent leakage. The operation of the device during the inhalation exposure is the reverse of the above since in this case the head of the mouse is introduced into the box in lieu of the body. The box is so designed that a number of animals may be exposed simultaneously, some by the inhalation route and some by the percutaneous route if so desired.

We claim:

1. An animal restrainer and exposure chamber comprising a rectangular box having a plurality of openings in the sides thereof, a cover, a rubber gasket adjacent to said cover and said box adapted to prevent leakage, a pair of jaws pivotally mounted on the outside of each hole adapted to be locked around the neck of an animal, and rubber gaskets adjacent said openings having corresponding openings of a smaller size.

2. An animal restrainer and exposure chamber comprising a rectangular box having a plurality of openings in the sides and an opening in each end thereof, a cover, a rubber gasket adjacent to said cover and said box adapted to prevent leakage, thin rubber gaskets on the inner walls of said box, said rubber gaskets having a plurality of openings, substantially smaller than and in alignment with said side openings, a pair of jaws surrounding each of the openings of said box, each of said jaws at their lower ends being pivotally mounted onto the exterior walls of said box so that the upper portions of said jaws can be clamped around the neck of a small animal for the purpose specified.

3. An animal restrainer and exposure chamber comprising a box having a plurality of centrally located openings in the sides and an opening in each end thereof, a cover mounted on top of said box by thumb screws, a rubber gasket adjacent to said cover and said box adapted to prevent leakage, a pair of thin rubber gaskets on the inner walls of said box the said rubber gaskets having a plurality of centrally located relatively small openings designed to fit tightly around the necks of small animals so as to prevent leakage through said side openings, a pair of jaws exteriorly surrounding each of the side openings the said jaws at their lower ends being pivotally mounted onto the exterior walls of said box whereby the upper portions of said jaws can be clamped around the neck of a small animal, a retaining angle, a screw and a knurled nut holding said jaws in a locked position.

References Cited in the file of this patent

UNITED STATES PATENTS 1,559,750      Hemm et al. _____ Nov. 3, 1925